United States Patent [19]

Stechmann

[11] Patent Number: 5,959,378
[45] Date of Patent: Sep. 28, 1999

[54] ELECTROMAGNETIC, TWO-PHASE PULSE MOTOR WITH TWO ROTATION DIRECTIONS

[75] Inventor: Helmut Stechmann, Villingen-Schwenningen, Germany

[73] Assignees: Echkhart W. Haller; Doris Stoll-Haller, both of St. Georgen, Germany

[21] Appl. No.: 08/931,996

[22] Filed: Sep. 17, 1997

Related U.S. Application Data

[63] Continuation-in-part of application No. 08/511,293, Aug. 4, 1995, abandoned.

[30] Foreign Application Priority Data

Aug. 10, 1994 [DE] Germany .............................. 44 28 243

[51] Int. Cl.⁶ .................................................. H02K 37/00
[52] U.S. Cl. .................................. 310/49 R; 310/40 MM; 310/254
[58] Field of Search .................................. 310/49 R, 162, 310/163, 164, 254, 40 MM

[56] References Cited

U.S. PATENT DOCUMENTS

| | | | |
|---|---|---|---|
| 4,144,467 | 3/1979 | Nakajima et al. | 310/49 R |
| 4,206,375 | 6/1980 | Sudler | 310/49 R |
| 4,371,821 | 2/1983 | Laesser et al. | 318/297 |
| 4,455,499 | 6/1984 | Sudler | 310/49 R |
| 4,634,906 | 1/1987 | Grosjean | 310/49 R |
| 4,782,353 | 11/1988 | Ogihara et al. | 354/243.1 |
| 4,958,099 | 9/1990 | Chigira et al. | 310/254 |
| 5,068,562 | 11/1991 | Tagami et al. | 310/256 |
| 5,321,330 | 6/1994 | Taghezout | 310/257 |

FOREIGN PATENT DOCUMENTS

| | | |
|---|---|---|
| 0 696 836 A1 | 7/1995 | European Pat. Off. . |
| 260370 | of 0000 | Germany . |
| 3026004 | of 0000 | Germany . |
| 3149943 C2 | 6/1983 | Germany . |
| 3519433 A1 | 5/1985 | Germany . |
| 44 28 243 | 8/1994 | Germany . |
| 548815 | of 0000 | Japan . |

OTHER PUBLICATIONS

International Published Application WO 85/00704 of Michel Grosjean, published Feb. 14, 1985 entitled "Multiphase Motor With Magnetized Rotor Having N Pairs of Poles With Axial Magnetization".

Patent Abstracts of Japan, vol. 004 No. 175 (E–36) entitled "Pulse Motor".

*Primary Examiner*—Nestor Ramirez
*Assistant Examiner*—Tran N Nguyen
*Attorney, Agent, or Firm*—Cowan, Liebowitz & Latman, P.C.; R. Lewis Gable; Morey B. Wildes

[57] ABSTRACT

An electromagnetic, two phased pulse motor rotatable in either of two rotary directions has a radially-magnetized rotor with a rotor axis and four magnetic poles of alternating polarities distributed evenly about the rotor axis whereby adjoining magnetic axes are oppositely polarized, and has two magnetic coils coupled magnetically to the rotor via two stator plates, each of which has two stator poles that are arranged relative to each other symmetrically reversed to a center line. Two of the stator poles directly adjoin each other and are offset from each other by an angle of 45°, and another two of the stator poles are offset from each other by an angle of 135°. Each of the first two stator poles has a pole surface disposed at a substantially constant distance from a surface of the rotor. Each of the second two stator poles has first and second pole surfaces disposed respectively at different distances from the rotor surface. The pulse motor still further includes an energizing source coupled to and applying selected current pulses of the same and/or opposite polarity to each of the first and second magnetic coils, whereby a magnetic field is generated to rotate about the rotor axis, the rotor is incrementally rotated about the rotor axis in steps of 45° and current pulses are applied to only one of the first and second magnetic coils to rotate the rotor about the rotor axis in steps of 22.5°.

4 Claims, 4 Drawing Sheets

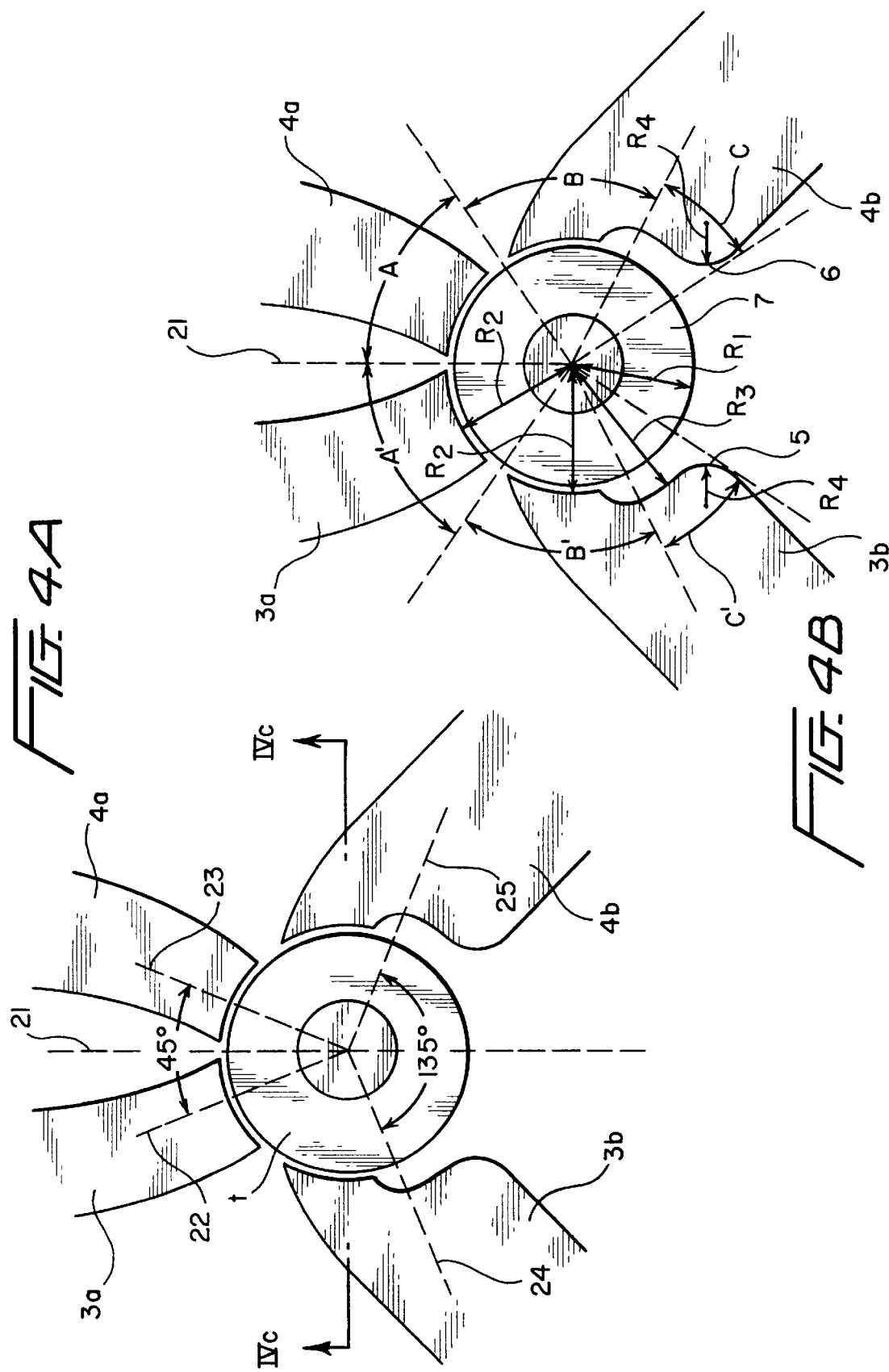

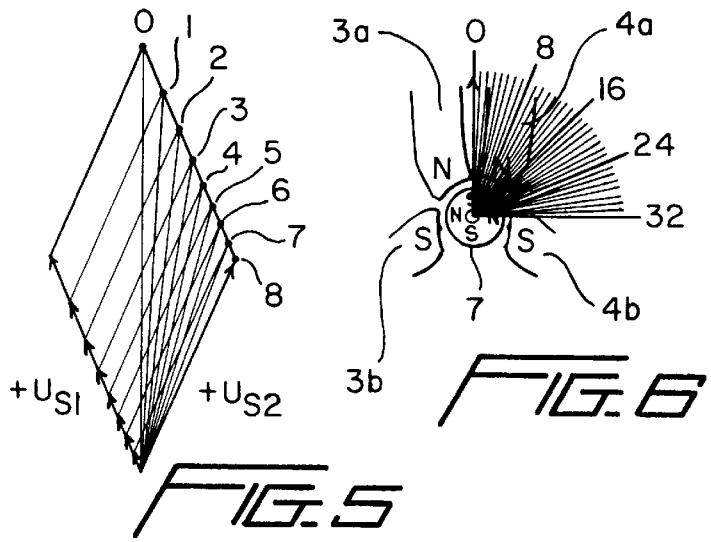
| Step Nr. | $U_S/U_M$ |
|---|---|
| 0 | 1.0 |
| 1 | 0.78 |
| 2 | 0.62 |
| 3 | 0.47 |
| 4 | 0.35 |
| 5 | 0.25 |
| 6 | 0.15 |
| 7 | 0.07 |
| 8 | 0.0 |
FIG. 5   FIG. 6   FIG. 7
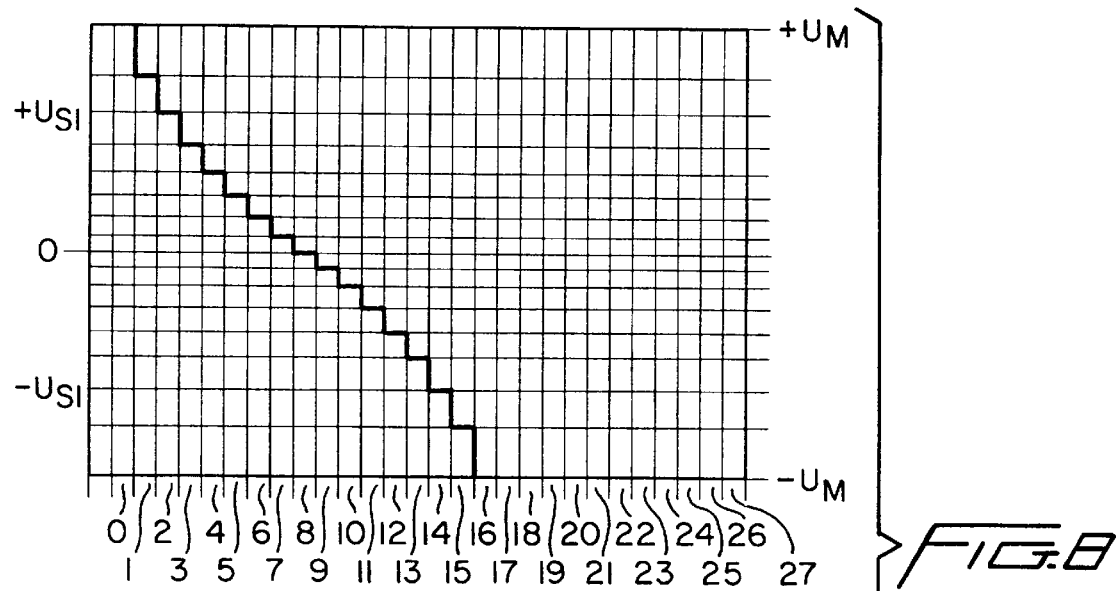
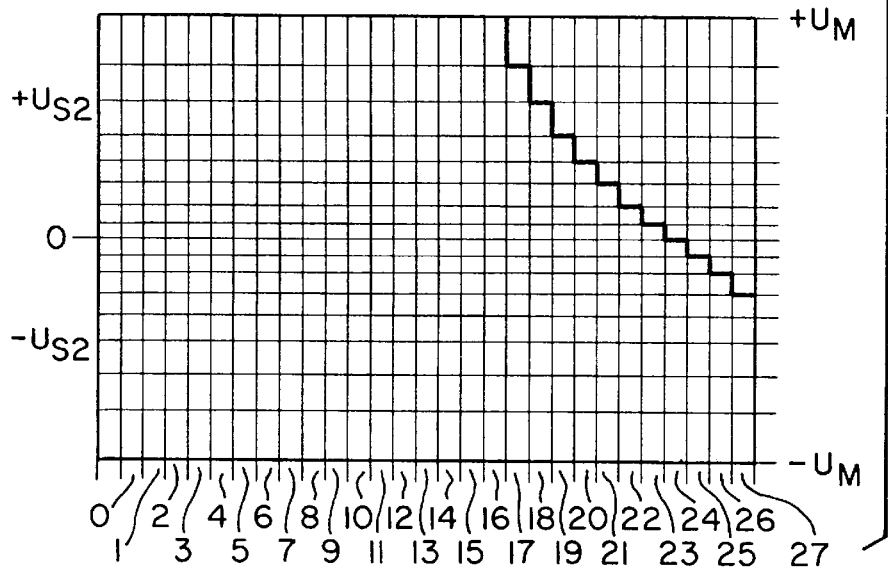
FIG. 8

ELECTROMAGNETIC, TWO-PHASE PULSE MOTOR WITH TWO ROTATION DIRECTIONS

CROSS-REFERENCE TO PRIOR APPLICATION

This application is a continuation-in-part application of prior, U.S. patent application Ser. No. 08/511,293, filed Aug. 4, 1995, now abandoned and which is incorporated herein by reference.

FIELD OF THE INVENTION

The present invention relates to a pulse motor.

BACKGROUND OF THE INVENTION

A similar pulse motor with four poles is known, for example, from DE 23 60 370 A1. If the rotor of this motor is not in the same position as it was at the beginning of a motor pulse, the rotor starts to move in the direction opposite to the intended one and then maintains this direction of rotation.

Japanese Patent No. 54/8815 and DE 30 26 004 A1 describe pulse motors with radially magnetized rotors and three stator poles.

Described in the magazine "Elektronik" from 1974, Issue 6, page 193, is a pulse motor with two directions of rotation which is provided with two stators, each of which has two pole shoes. Since the stators cross each other in this motor, this results in a relatively great, and thus disadvantageous height.

The present invention is based primarily on the objective of designing an electromagnetic pulse motor in such a way that it has the flattest construction possible and is also very economical to produce.

Such preferably flat pulse motors are required, for example, for clock technology, in particular for analog radio clocks, whereby the pulse motor moves the hands by way of a gear chain. According to another requirement, the hands must also be adjustable with a high adjusting speed. This high adjusting speed can be achieved with two-phased pulse motors of the mentioned type.

Such pulse motors are also necessary for analog motor vehicle display instruments in which digital measuring values must be converted into analog displays.

For analog displays of vehicle driving states, the pulse motor must have extremely good synchronization characteristics and ensure a jerk-free rotation. These characteristics are only realized if the step angles are very small and are of equal size for one rotor revolution. Another important requirement is that no dwelling or stopping moments act on the rotor inside the stator poles when the coils are unpowered. If these requirements are not met, the rotor performs a swinging movement after passing through one step angle, whereby this swinging movement manifests itself in the display instruments as a trembling of the hand that is perceptible to the human eye. This trembling of the hand also occurs when the reduction gear between rotor and hand per se permits minimal step angles of the hands.

SUMMARY OF THE INVENTION

The invention is therefore based on the additional, partial objective of designing the pulse motor so that, in order to avoid unequal step angles, no dwelling or stopping moments are able to act on the rotor.

In order to realize the first partial objective, a first characteristic of the invention suggests that in order to generate smaller angle steps, i.e., angle steps of 22.5°, alternately only one magnetic coil of the two magnetic coils is supplied with current, while the respective other one is not powered.

Even this measure per se permits the use of simpler and more compact reduction gears, thus permitting the economic production of flat pulse motors.

The second partial objective, according to which the rotor is supposed to rotate by implementing equally sized steps without dwelling or trembling movements, i.e., with even movements, is realized according to a second characteristic of the invention by means of the construction of the pole surfaces as stator poles.

According to this suggestion, pulse motors with high precision and small dimensions that are particularly suitable for the analog display of vehicle states in motor vehicles can be produced economically.

The dimensions of this pulse motor are advantageously selected.

In addition, the rounding of the marginal surfaces of the two stator poles that are positioned apart from each other is important for the desired synchronization of the pulse motor.

The suggestion that the step angles of the rotor can be divided into smaller microsteps, contributes to significantly improved synchronization and precision.

In the process, the dimensions of the graduated voltage pulses contributes to a linear rotation of the rotor.

BRIEF DESCRIPTION OF THE DRAWINGS

The subject matter of the invention is explained in more detail below in reference to the schematic portrayals in the drawings, in which:

FIG. 4A shows an enlarged detail of FIG. 3 showing reference lines;

FIG. 4B shows an enlarged detail of FIG. 3 with drawn-in angles A, B and C.

FIG. 5 shows a parallelogram for determining the voltage pulses $U_{S1}$ and $U_{S2}$ with a division into n=8 microsteps;

FIG. 6 shows a graphic portrayal of the rotor position over an angle of rotation of 90° with 32 microsteps;

FIG. 7 shows a table of the voltage parallelograms according to the control voltages that result according to FIG. 5; and, FIG. 8 shows a diagram of the voltage pulses $U_{S1}$ and $U_{S2}$ resulting from FIG. 5 to 7.

PREFERRED EMBODIMENT OF THE INVENTION

Figure 1:
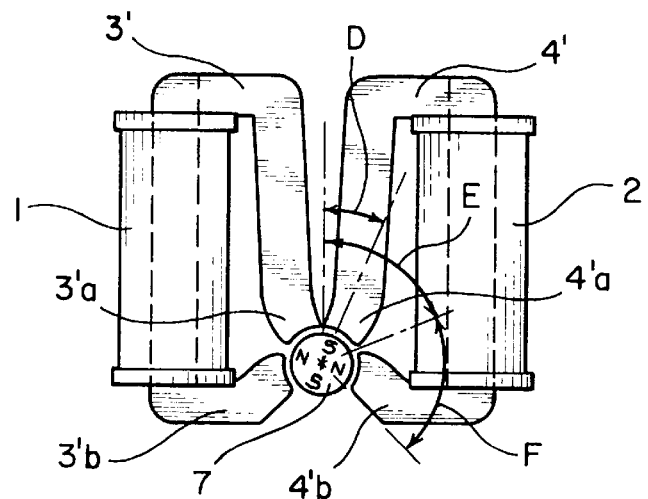
FIG. 1 shows a side view of a pulse motor in which the rotor can be switched to move in step angles of 22.5°.

FIG. 1 shows a pulse motor in which, as is explained below in reference to FIG. 2, a so-called half-step operation with a step angle of D=22.5° is possible. This pulse motor is provided with identically constructed stator plates 3', 4' of a soft-magnetic material, on which the magnetic coils 1, 2 are arranged. The stator plates 3', 4' end in stator poles 3'a and 3'b or 4'a, 4'b between which the four-pole, permanent magnet rotor 7 with the two north poles N and the south poles S is rotatably arranged. In this way the stator plates 3', 4' each form two separate magnet circuits with magnetic coils 1, 2 while integrating the rotor 7. The two magnetic circuits with their stator poles 3'a and 3'b or 4'a, 4'b respectively, are located at an angle of 90° to each other, whereby the stator poles are arranged in relation to each other so that two stator poles, i.e., in FIG. 1 stator poles 4'a and 4'b, act on two poles (N, S) of the rotor 7, while the other two stator poles, here poles 3'a and 3'b, act on the neutral zones located between the North and South poles of the rotor 7.

Figure 2:
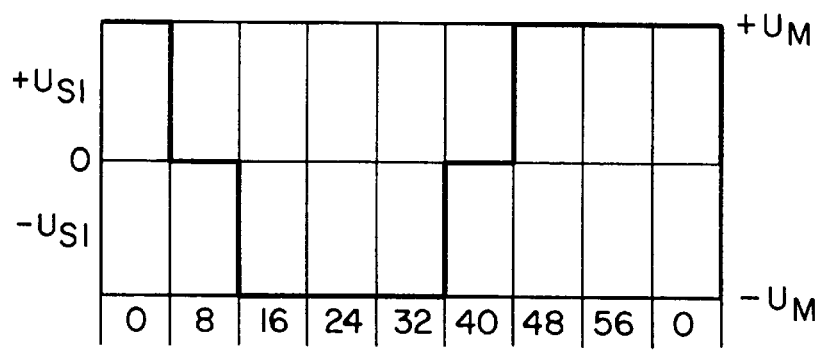
FIG. 2 shows a pulse diagram for the power supply of magnetic coils 1 and 2 with voltage pulses $U_{S1}$ and $U_{S2}$.
Figure 2:
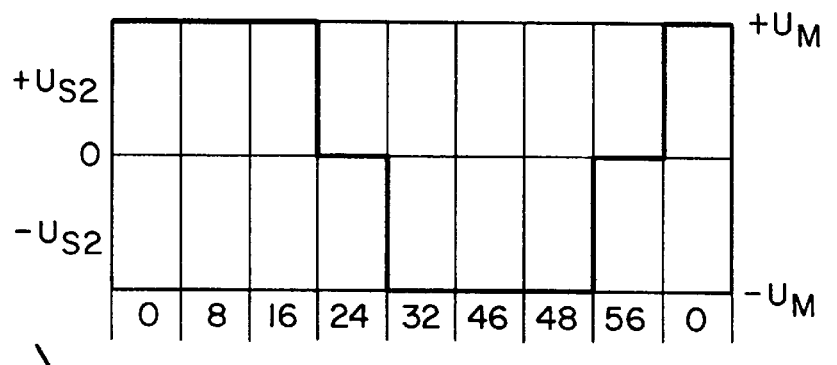

The magnetic coils 1, 2 are excited with the voltage pulse drawn in FIG. 2, creating a rotary field that sets the rotor 7 into a defined rotary motion with angle steps D=22.5°. Additional half-steps with angle steps of D=22.5° between the full steps in which both coils are excited are possible, as is shown, for example, in positions 8, 24, 40, and 56, by exciting only one each of the two magnetic coils 1, 2, while at the other positions the magnetic coils 1, 2 are excited simultaneously with voltage pulses of different polarity.

As is described above, it is the objective of the invention to create a pulse motor that is in particular suitable for display instruments, and in which the rotor rotates continuously and evenly so that the hand that is connected to the rotor does not tremble. This is indeed already achieved in part by means of the half-step operation with step angles of only 22.5°. But even this step angle is not small enough to create the impression of an analog hand movement in the observer.

According to the finding of the inventor, the reason for this trembling movement is that in the arrangement according to FIG. 1 the rotor is pulled to a full rotation in four dwelling positions without any power being supplied to magnetic coils 1 and 2. During operation, these dwelling forces act in the circumferential direction in such a way that, when power is applied, the rotor initially follows until it reaches the unstable state between two dwelling positions, and then jumps forward to the next dwelling position. But this does not permit for a controlled and even rotary movement of the rotor by way of a voltage graduation alone. Even in the presence of a high gear reduction and minuscule step angles, the eye perceives the delay and acceleration of the rotor movement created by the dwelling moment as a trembling of the hand.

Figure 3:
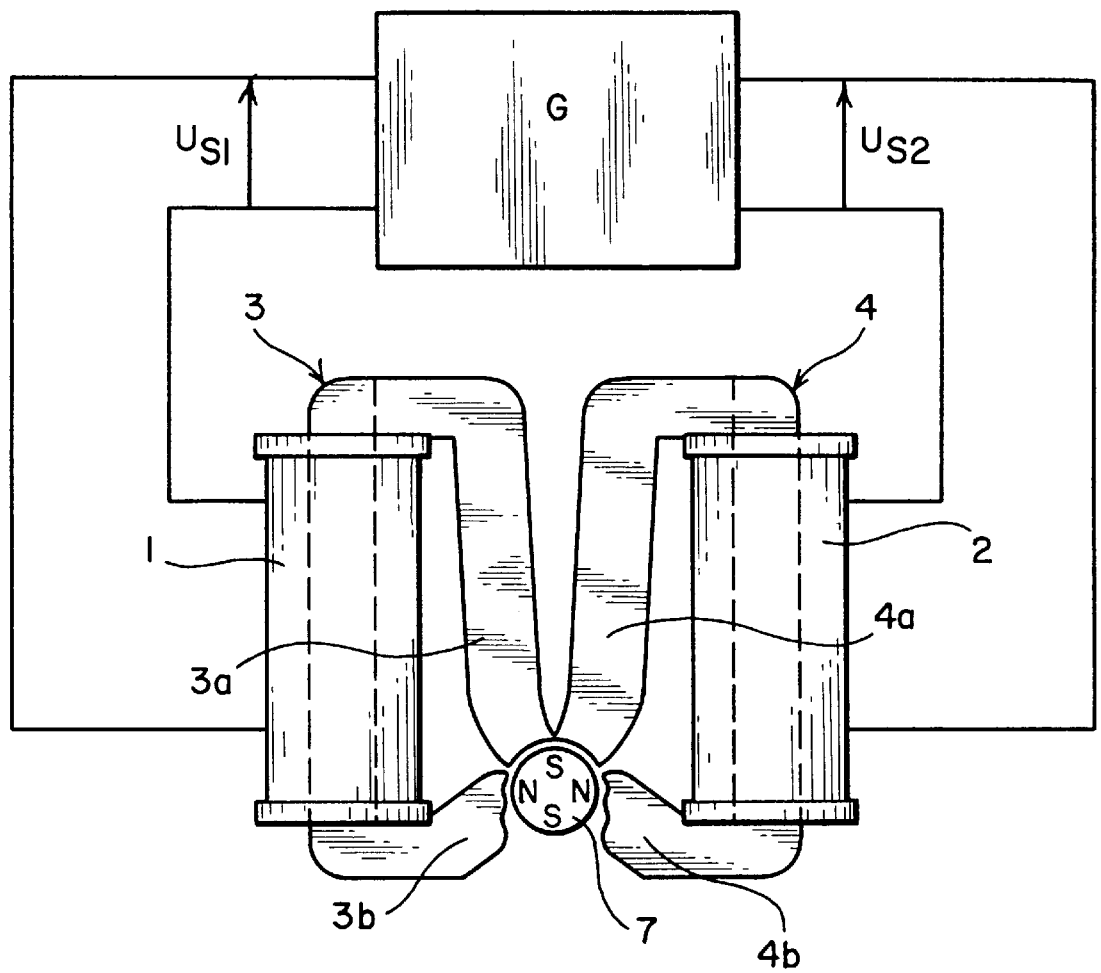
FIG. 3 shows a side view of a pulse motor in which the rotor can also be switched to move in angle steps of 22.5°, but which has pole shoes constructed according to the invention.

According to the findings of the inventor, this disadvantage can be avoided through the stator pole design, particularly of stator poles 3b, 4b, provided in the exemplary embodiment according to FIG. 3 and FIGS. 4A and 4B. While the pole surfaces of stator poles 3a and 4a facing the rotor 7 maintain a constant distance from the surface of the rotor 7 when seen in circumferential direction of the rotor 7, the pole surfaces of stator poles 3b, 4b are graduated. Especially FIG. 4B shows that the pole surfaces of stator poles 3b, 4b extend along an arc, designated with B, at the same distance from the surface of rotor 7 as the respective pole surfaces of stator poles 3a, 4a. The pole surfaces in the angle range or arc C are in contrast set back or spaced from, so that a rounded step is created between arcs B and C. According to another characteristic, the outer marginal areas 5, 6 of these stator poles 3b and 4b are rounded.

With this design of the stator poles, the disadvantageous dwelling moment acting on the rotor 7 is very significantly reduced. This can be seen by the fact that the rotor does not take a forward moving position in the unpowered state of the magnetic coils 1, 2. During operation, the rotor follows exactly the supplied coil voltage without any jumping effects.

In empirical studies it was found that an optimum synchronization can be achieved with the following dimensions:

The ratio of the rotor diameter R1 to the diameter R2, related to the rotor center, of the partially cylindrical pole shoe surfaces of stator poles 3a, 4a and the partial areas of stator poles 3b, 4b should be within the following range:

R1:R2=0.7 to 0.9, preferably 0.8.

The ratio of said radius R2 to the radius R3 of the partial areas of stator poles 3b, 4b located in the angle range C should be within the following range:

R2:R3=0.7 to 0.9, preferably 0.86.

The ratio of the rounding radius R4 in the marginal areas R5, R6 of the stator poles 3b, 4b to the rotor radius should be within the following range:

R4:R1=0.5 to 0.6, preferably 0.5.

Another rule for dimensions was determined empirically for the effective width of the stator poles 3a, 4a and 3b, 4b. While these areas, designated in the exemplary embodiment according to FIG. 1 as E and F, are of the same size, the following ranges for an optimum synchronization were found to be advantageous for the above mentioned dimensions of the ratios of the radii.

Angle range A and A' for the pole surfaces of stator poles 3a, 4a

A=67.5°

Angle range B and B' for the pole surface area of stator poles 3b, 4b close to the rotor

B=41.0°

Angle range C and C' for the area of the stator poles 3b, 4b away from the rotor

C=31°.

In operation to move the rotor 7 forward, the magnetic coils 1 and 2 can be excited with the pulse generator G in the same manner as indicated in the diagram according to FIG. 2. As in the case of the exemplary embodiment according to FIG. 1, this results in step angles of 22.5° which, thanks to the stator pole design of rotor 7, can be passed through largely without any trembling movements.

An even better equalization of the rotor movement can be achieved by further dividing this step angle.

According to another suggestion of the invention, a pulse generator G as shown in FIG. 3 for this purpose generates the voltage pulses shown in the voltage diagram of FIG. 5 and in the time diagram of FIG. 8, whereby said voltage pulses are supplied to the magnetic coils 1 and 2 in n=8 steps within a step angle range of 22.5°.

The voltage parallelogram according to FIG. 5 illustrates the coil voltages $U_{S1}$, and $U_{S2}$ with a spatial allocation of the stator pole pairs 3a, 3b, and 4a, 4b according to FIGS. 3 and 4.

During the excitation of both coils 1 and 2 with the maximum voltage $U_{max}$, the rotor is held in the center position 0, which is also designated as 0 in FIG. 6. If only one coil is excited, the rotor takes the position 8 according to FIG. 6, i.e., it has passed through a step angle of 22.5°. This step angle can be divided by further microsteps 1 to 8 so that initially the voltage $U_{S1}$, is gradually reduced in the presence of a constant voltage $U_{S2}$. The rotor 7 hereby passes through the positions between 0 and 8 drawn in the voltage parallelogram of FIG. 5 according to the voltage arrows drawn in FIG. 6 between 0 and 8.

Another forward move from position 8 in FIG. 6 results when the excitation voltage $U_{S1}$, is then, starting from 0 in steps to $-U_{max}$, reduced in the presence of a constant voltage $U_{S2}$, until the rotor has reached the position 16. In this position, the voltage $U_{S1}=-U_{max}$ is maintained, in order to now gradually reduce the voltage $U_{S2}$ from $+U_{max}$ to 0, and then to $-U_{max}$. These voltage steps are shown separately in the two voltage diagrams for voltages $U_{S1}$, and $U_{S2}$ in FIG. 8.

In order to then obtain microsteps of the same size, it is now necessary, as is shown graphically in the voltage parallelogram according to FIG. 5, that the voltage ratios $U_S/U_{max}$ are set according to the table in FIG. 7. This table shows that the voltage ratio changes according to a nonlinear function in order to achieve equal angle steps.

The voltage parallelogram according to FIG. 5 also shows that, depending on polarity and size of the voltage pulses $U_{S1}$, $U_{S2}$, the rotor may pass through a clockwise or counter-clockwise rotation.

Figure 4C:
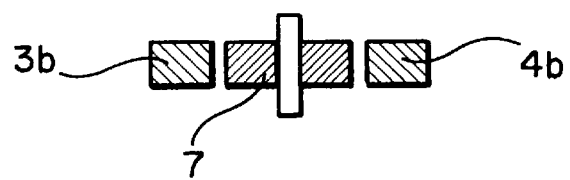
FIG. 4C shows a section along line IVC—IVC in FIG. 4A.

Especially FIG. 4C shows that the invention can be realized with a pulse motor with a radially magnetized permanent magnet rotor 7 in the same plane as the stator poles 3a, 4a, 3b, 4b. Such a rotor has a particularly low moment of inertia, so that it is suitable for applications where high dynamics are critical.

But the invention in principle can be used also for arrangements with axially magnetized rotor in which the rotor poles 3a, 4a, 3b, 4b are axially offset to the rotor 7 by the rotor thickness and extend over it radially. In this arrangement, the field lines exit vertically to the stator plate plane.

As has been described herein, therefore, this invention shows an electromagnetic, two-phased pulse motor having two rotary directions, with a plate-shaped, preferably radially magnetized, permanent magnet rotor 7 provided with four poles (N, S) of alternating polarity offset by 90° from each other. The motor has magnetic coils 1,2 that are each magnetically coupled with the rotor by way of two stator plates 3,4, each having two stator poles (3a,3b and 4a,4b, respectively) that form a magnetic circuit. Stator poles 3a,3b,4a,4b are arranged relative to each other symmetrically reversed to an imagined center line and are offset relative to each other such that two stator poles (3a, 4a) of the two stator pole pairs (3a, 3b; 4a, 4b) directly adjoin each other and are offset to each other by an angle of 45°, and such that the other two stator poles (3b, 4b) are offset from each other by an angle of 135°. These angles of offset can be measured from a center point on the face or pole surface of each of stator pole 3a,3b,4a,4b. Alternatively, these offset angles can be seen clearly in FIG. 4A, with use of reference lines 22,23,24,25 of stator pole 3a,4a,3b,4b, respectively.

The motor further has a switching arrangement G for supplying power to magnetic coils 1,2 that creates a rotary field, the power consisting of current pulses of identical or opposite polarity, either of which may be selectively applied, in such a way that rotor 7 is moved forward in angle steps of 22.5°. For generation of additional angle steps of 22.5° between angle steps of 45°, during which both magnetic coils 1,2 are supplied with power, only one magnetic coil 1,2 is supplied with power while the other is non-powered. In addition, the pole surfaces of the directly adjoining stator poles 3a,4a are situated at a constant distance from the surface of rotor 7, while the pole surfaces of the other two stator poles 3b,4b are each provided along the circumferential direction of rotor 7 with a step such that each has two surface areas, one of which (B) is situated at a smaller distance form the surface of rotor 7, and the other of which (C) is situated at a greater distance from the surface of rotor 7.

The step motor suggested by the invention enables a rotation of the rotor with minuscule, equally sized microsteps and furthermore ensures that no dwelling moments act on the rotor in the unpowered state. This results in a digital, i.e., voltage-pulse-controlled pulse motor whose rotor rotates almost like the rotor of an analog-controlled motor in an even and non-banking manner.

I claim:

1. An electromagnetic, two phased pulse motor operative to rotate in either of two rotary directions, said pulse motor having a center line, said motor comprising:

a) a plate shaped, permanent radially magnetized rotor having an end face, a rotor axis and four magnetic poles of alternating polarities distributed evenly about said rotor axis whereby adjoining magnetic axes are oppositely polarized;

b) first and second stator plates, each of said first and second stator plates comprising first and second stator poles, each of said stator poles disposed in one plane and has a reference line passing through said rotor axis and defining a common reference point for each of said stator poles, said plurality of stator poles being arranged relative to each other symmetrically reversed to said center line, said reference lines of said two first of said plurality of stator poles directly adjoining each other and being offset from each other by an angle of 45°, said reference lines of said second two of said plurality of stator poles being offset from each other by an angle of 135°, each of said first two stator poles including a pole surface disposed at a substantially constant distance from a surface of said rotor, each of said second two of said plurality of said stator poles including first and second pole surfaces disposed respectively at different distances from said rotor surface;

c) first and second magnetic coils, each of said first and second magnetic coils being arranged by said first and second stator plates respectively on one side of and coupled magnetically via said first and second stator plates respectively to said rotor to form therewith first and second magnetic circuits respectively, said first and second magnetic circuits being arranged in a single plane; and d) an energizing source coupled to and applying current pulses of a selected one of the same and opposite polarity to each of said first and second magnetic coils, whereby a magnetic field is generated to rotate about said rotor axis and said rotor is incrementally rotated about said rotor axis in steps of 45° and applying current pulses to only one of said first and second magnetic coils to rotate said rotor about said rotor axis in steps of 22.5°;

wherein each of said pole surfaces of said two first stator poles extends over a first angle area (A) measured in both rotary directions relative to said center line; each said pole surface of said two second stator poles extend respectively over second and third areas (B) and (C) measured in both rotary directions relative to said center line and to said angle area (A), whereby said angle areas (B) and (C) adjoin each other and are graduated in relation to each other; said rotor has a diameter (R1); said pole surfaces of each of said two first stator poles adjoin each other and adjoin one of said two second stator poles surfaces; each said pole surface of said two second stator poles are respectively disposed at a first radius (R2) from said rotor axis over said angle area (B) and at a second radius (R3) from said rotor axis over said angle area (C); characterized by the following dimensions:

A=67.5°;
B=41°;
C=31°;
R1:R2=0.7 to 0.9; and
R2:R3=0.7 to 0.9.

2. The pulse motor as claimed in claim 1, wherein said first and second pole surfaces of said two stator poles are spaced apart from each other and are rounded with a radius (R4) which is approximately half the size of the rotor radius (R1).

3. The pulse motor as claimed in claim 1 wherein the ratio of R1 to R2 is 0.8.

4. The pulse motor as claimed in claim 1 wherein the ratio of R2 to R3 is 0.86.

* * * * *